(12) United States Patent
Muraguchi et al.

(10) Patent No.: US 7,323,122 B2
(45) Date of Patent: Jan. 29, 2008

(54) SILICA-BASED PARTICLES COATED WITH ANTIMONY OXIDE, METHOD OF PRODUCING THE PARTICLES, AND BASE MATERIAL WITH A COATING FILM INCLUDING THE PARTICLES

(75) Inventors: Ryo Muraguchi, Fukuoka-ken (JP); Mitsuaki Kumazawa, Fukuoka-ken (JP); Hiroyasu Nishida, Fukuoka-ken (JP); Toshiharu Hirai, Fukuoka-ken (JP)

(73) Assignee: Catalysts & Chemicals Industries Co., Ltd., Kitakyushu, Fukuoka (JP)

( * ) Notice: Subject to any disclaimer, the term of this patent is extended or adjusted under 35 U.S.C. 154(b) by 438 days.

(21) Appl. No.: 10/965,213

(22) Filed: Oct. 15, 2004

(65) Prior Publication Data

US 2005/0121654 A1    Jun. 9, 2005

(30) Foreign Application Priority Data

Oct. 17, 2003 (JP) .............................. 2003-357113

(51) Int. Cl.
*H01B 1/08* (2006.01)
(52) U.S. Cl. .................. 252/521.3; 428/403; 252/518.1
(58) Field of Classification Search ............. 252/518.1, 252/521.3; 428/403
See application file for complete search history.

(56) References Cited

U.S. PATENT DOCUMENTS 5,021,091 A * 6/1991 Takarada et al. ....... 106/287.16
5,585,037 A * 12/1996 Linton ......................... 252/506
5,717,988 A * 2/1998 Jinzai et al. ................. 399/333
6,221,326 B1   4/2001 Amiche
2004/0086724 A1 * 5/2004 Suzuki et al. ............... 428/446

FOREIGN PATENT DOCUMENTS

JP     405116930 A * 5/1993

OTHER PUBLICATIONS

Patent Abstracts of Japan; Publication No. 06-330606, Publication Date: Nov. 29, 1994; Applicant: Soda Koryo KK et al.
Patent Abstract of Japan; Publication No. 07-013137, Publication Date: Jan. 17, 1995; Applicant: Suzuki Yushi Kogyo KK.
Patent Abstracts of Japan; Publication No. 11-029318, Publication Date: Feb. 2, 1999; Applicant: Nippon Millipore KK.
Patent Abstracts of Japan; Publication No. 07-133105, Publication Date: May 23, 1995; Applicant: Catalysts & Chemi Ind Co Ltd.
Patent Abstracts of Japan; Publication No. 2001-233611, Publication Date: Aug. 28, 2001; Applicant: Catalysts & Chem Ind Co Ltd.

* cited by examiner

*Primary Examiner*—Mark Kopec
(74) *Attorney, Agent, or Firm*—Manabu Kanesaka

(57) ABSTRACT

Silica-based particles coated with antimony oxide with a low refractive index and having conductivity are provided. The silica-based particles coated with antimony oxide comprise porous or hollow silica-based particles with antimony oxide coated thereon. A refractive index of the silica-based particles coated with antimony oxide is in the range from 1.35 to 1.60 with the volume resistivity value in the range from 10 to 5000 $\Omega/cm$ and the average particle diameter in the range from 5 to 300 nm, and the thickness of the antimony oxide coating layer is in the range from 0.5 to 30 nm.

7 Claims, No Drawings

US 7,323,122 B2

SILICA-BASED PARTICLES COATED WITH ANTIMONY OXIDE, METHOD OF PRODUCING THE PARTICLES, AND BASE MATERIAL WITH A COATING FILM INCLUDING THE PARTICLES

TECHNICAL FIELD

The present invention relates to silica-based particles coated with antimony oxide having a low refractive index and conductivity, a method of producing the particles, and a base material (substrate) with a coating film including the particles.

BACKGROUND TECHNOLOGY

There has been known hollow silica particles each having the diameter in the range from about 1 to about 300 μm (Refer to, for instance, Patent Document 1 and Patent Document 2). Further there has been known a method of producing hollow particles each comprising a fine silica shell by depositing active silica from an aqueous solution of alkali silicate metal on a core made from a material other than silica and removing the material without breaking the silica shell (Refer to Patent Document 3 and other related documents).

This applicant previously proposed to obtain composite oxide particles with a nanometer size and a low refractive index by completely coating a surface of a porous inorganic oxide particle with silica or the like (Refer to Patent Document 5), and also proposed to obtain hollow silica-based particles each with a nanometer size and a low refractive index by forming a silica coating layer on core particles of a composite oxide each comprising silica and an inorganic oxide other than silica and removing the inorganic oxide other than silica to coat the particle with silica according to the necessity (Refer to Patent Document 6).

Each of the types of particles described above has a low refractive index, and the particles are used for blending in a reflection reducing coating for various types of display units, and to produce excellent transparency of the reflection reducing coating or to reduce haze therein, generally particles each with the diameter of about 0.2 μm or below are used. Further, also the porous particles have the capability of reducing reflection, so that the porous particles are used to form a reflection reducing coating for a display unit.

On the other hand, electronic equipment such as a display device has a problem of deposition of foreign particles or dusts caused on electrification, and further negative effects by electromagnetic waves emitted from electronic equipment over human health are other problems of growing concerns. To overcome this problem, recently an antistatic coating, an electromagnetic masking film or the like with a conductive material blended therein is provided on a surface of a display device or the like, and in this case, particles of metals such as silver or silver-palladium or those of oxides such as tin-doped indium oxide, or antimony-doped tin oxide are used as the conductive materials. However, the conductive particles as described above have a high refractive index respectively and further the metallic particles are colored, so that there are various restrictions not only in the blending rate, particle diameter, dispersibility, but also in the economical aspect.

[Patent Document 1] Japanese Patent Laid-Open Publication No. HEI 6-330606
[Patent Document 2] Japanese Patent Laid-Open Publication No. HEI 7-013137
[Patent Document 3] Japanese Patent Laid-Open Publication No. 2000-500113
[Patent Document 4] Japanese Patent Laid-Open Publication No. HEI 11-029318
[Patent Document 5] Japanese Patent Laid-Open Publication No. HEI 7-133105
[Patent Document 6] Japanese Patent Laid-Open Publication No. 2001-233611

DISCLOSURE OF THE INVENTION

An object of the present invention is to provide silica-based particles coated with antimony oxide having a low refractive index and conductivity, a method of producing the particles, and a base material (substrate) with a coating film including the particles.

Silica-based particles coated with antimony oxide according to the present invention are those prepared by coating porous silica-based particles or hollow silica-based particles with antimony oxide, and have the refractive index in the range from 1.35 to 1.60 and also have the volume resistivity value in the range from 10 to 5000 Ω/cm.

The silica-based particles coated with antimony oxide preferably have the average particle diameter in the range from 5 to 300 nm and the thickness of the antimony oxide coating layer in the range from 0.5 to 30 nm.

The method of producing the silica-based particles coated with antimony oxide according to the present invention comprises the step of adding an antimonic acid dispersion into a dispersion of porous silica-based particles or hollow silica-based particles to coat surfaces of the silica-based particles with the antimonic acid.

The dispersion of the hollow silica-based particles is preferably prepared through the following steps (a) and (b) of:

(a) adding at the same time an aqueous solution of silicate and/or an acidic silicic acid solution and an alkali-soluble inorganic compound aqueous solution into an alkaline aqueous solution or into an alkaline aqueous solution with seed particles dispersed therein, if required, to prepare a dispersion of composite oxide particles in the molar ratio $MO_x/SiO_2$ in the range from 0.3 to 1.0 wherein $SiO_2$ indicates silica and $MO_x$ indicates an inorganic oxide other than silica and also further adding, when the average particle diameter of the composite oxide particles is in the range from about 5 to about 50 nm, an electrolyte salt so that a ratio of the number of moles of the electrolyte salt $(M_E)$ versus the number of moles of $SiO_2(Ms)$ $((M_E)/(M_S))$ is in the range from 0.1 to 10 to prepare a dispersion of the composite oxide particles; and (b) further adding an electrolyte salt into the dispersion of composite oxide particles according to the necessity and then adding an acid for removing at least a portion of elements other than silicon constituting the composite oxide particles to prepare a dispersion of silica-based particles.

The base material (substrate) with a coating film according to the present invention is characterized in that the coating film including the silica-based particles coated with antimony oxide and a matrix for forming a coating film is formed singly or with other coating(s) on a surface of the base material.

With the present invention, it is possible to obtain silica-based particles coated with antimony oxide having a low refractive index and conductivity. Further it is possible to obtain a base material with a coating film excellent in the antistatic characteristics and reflection preventing capability and also in such characteristics as adhesiveness, strength, and transparency.

Especially, when a base material with a low refractive index is used, if conductive particles with a high refractive index are used as a conductive layer, the difference of the refractive index of the base material and that of the conductive layer is large and sometimes an interference band may be generated, but when the silica-based particles coated with antimony oxide according to the present invention are used, generation of an interference band can be prevented without fail.

BEST MODE FOR CARRYING OUT THE INVENTION

1. Silica-based Particles Coated with Antimony Oxide

In the silica-based particles coated with antimony oxide according to the present invention, porous silica-based particles or hollow silica-based particles are coated with an antimony oxide coating layer.

The porous silica-based particles include porous silica particles and porous composite oxide particles containing silica as the main ingredient, and composite oxide particles with a low refractive index and the nanometer size prepared by coating surfaces of porous inorganic oxide is particles with such a material as silica as disclosed in Japanese Patent Laid-Open Publication No. HEI 7-133105 filed by the present applicant may preferably be used for this purpose.

Further as the hollow silica-based particles, also the silica-based particles disclosed in Japanese Patent Laid-Open Publication No. 2001-233611 filed by this applicant, comprising silica and inorganic oxide(s) other than silica and having a low refractive index and nanometer size may preferably be used.

The porous silica-based particles or the hollow silica-based particles as described above preferably have the average particle diameter in the range from 4 to 270 nm, and more preferably in the range from 8 to 170 nm. It is difficult to obtain silica-based particles having the average particle diameter of less than 4 nm, and even if it is possible to obtain such particles, the stability is sometimes insufficient, which may make it impossible to obtain monodisperse silica-based particles coated with antimony oxide. When the average particle diameter is over 270 nm, the average particle diameter of obtained silica-based particles coated with antimony oxide may be more than 300 nm, and in a coating film containing the silica-based particles coated with antimony oxide as described above, sometimes the transparency is low with high haze.

The refractive index of the porous silica-based particles or hollow silica-based particles described above is preferably not more than 1.45 equivalent to that of silica, and more preferably not more than 1.40. The non-porous silica-based particles with the refractive index in the range from 1.45 to 1.46 may be used singly, but in that case the reflection preventing capability may be insufficient.

The silica-based particles are coated with antimony oxide, and the average thickness of the coating layer is in the range from 0.5 to 30 nm, and preferably in the range from 1 to 10 nm. When the average thickness of the coating layer is less than 0.5 nm, sometimes the silica-based particles are not completely coated, and also conductivity of obtained silica-based particles coated with antimony oxide may be insufficient. When the thickness of the coating layer is over 30 nm, the effect of improving the conductivity is reduced, and when the average particle diameter of the silica-based particles coated with antimony oxide is small, the refractive index is insufficient.

The silica-based particles coated with antimony oxide according to the present invention preferably have the average particle diameter in the range from 5 to 300 nm, and more preferably in the range from 10 to 200 nm. It is difficult to obtain silica-based particles coated with antimony oxide having the average particle diameter of less than 5 nm, and even when such particles are obtained, there are aggregated particles therein and the dispersibility is insufficient, and when the particles are used for forming a transparent coating film, such characteristics of the coating as transparency, haze, strength, and adhesiveness to the base material may be insufficient. When the average particle diameter of the silica-based particles coated with antimony oxide is over 300 nm, the transparency of the coating may be low with high haze therein. In addition, sometimes the adhesiveness to the base material may be insufficient.

A refractive index of the silica-based particles coated with antimony oxide should preferably be in the range from 1.35 to 1.60, and more preferably be in the range from 1.35 to 1.50. It is difficult to obtain the particles with the refractive index of less than 1.35, and even when such particles are obtained, the strength of the particles is insufficient. On the other hand, when the refractive index is over 1.60, the reflection preventing capability of the transparent coating film may be insufficient, although it depends also on an refractive index of the base material.

A volume resistivity value of the silica-based particles coated with antimony oxide should preferably be in the range from 10 to 5000 $\Omega$/cm, and further more preferably in the range from 10 to 2000 $\Omega$/cm. It is difficult to obtain the particles with the volume resistivity value of less than 10 $\Omega$/cm, and even when such particles are obtained, the refractive index is over 1.6, and the reflection preventing capability of the transparent coating film is insufficient. On the other hand, when the volume resistivity value is over 5000 $\Omega$/cm, the antistatic capability of the transparent coating film is insufficient.

The silica-based particles coated with antimony oxide according to the present invention may be subjected to the surface processing with a silane coupling agent by employing the conventional method according to the necessity.

2. Method of Producing the Silica-based Particles Coated with Antimony Oxide

The method of producing the silica-based particles coated with antimony oxide according to the present invention comprises the step of adding an antimonic acid dispersion (aqueous solution) into a dispersion of porous silica-based particles or hollow silica-based particles to coat surface of the silica-based particles with the antimonic acid.

As the porous silica-based particles, porous silica particles or porous composite oxide particles containing silica as the main ingredient are used. Herein the term of "porous particles" is defined as that indicating particles each having a surface area larger, when measured by the dripping method or the BET method, as compared to an external surface area of the particle computed from the average particle diameter of the particles, and as the porous silica-based particles as described above, the particles of composite oxide having a low refractive index and a size in the order of nanometers prepared by coating surfaces of porous inorganic oxide particles with silica or the like disclosed in Japanese Patent Laid-Open Publication No. HEI 7-133105 filed by this applicant may advantageously be used.

As the hollow silica-based particles, also the hollow silica-based particles having a low refractive index and a size in the order of nanometers and comprising silica and an inorganic oxide other than silica disclosed in Japanese Patent Laid-Open Publication No. 2001-233611 filed by the present applicant may advantageously be used. The cavity can be checked by observing a cross section of a particle with a transmission electron microscope (TEM).

At first, a dispersion of porous silica-based particles or hollow silica-based particles is prepared. A solid concentration of the dispersion should preferably be in the range from 0.1 to 40% by weight, and more preferably in the range from 0.5 to 20% by weight. When the solid concentration is less than 0.1% by weight, the efficiency is low, and when the solid concentration is over 40% by weight, sometimes the obtained silica-based particles coated with antimony oxide may aggregate, and in that case, when the particles are applied to a base material with a coating film, the dispersibility in the coating film drops, which may in turn cause such problems as degradation of transparency of the coating film or high haze.

Alternately, a dispersion (aqueous solution) of antimonic acid is prepared. For preparing the antimonic acid, any method may be employed on the condition that a coating film of antimony oxide can be formed on surfaces of the particles without filling pores of the porous silica-based particles or hollow silica-based particles, but the following method is preferable in the point that a homogeneous and thin antimony coating film can be formed.

More specifically, a dispersion of antimonic acid (gel) is prepared by processing an alkaline aqueous solution of antimony oxide with a cation exchange resin, and then the dispersion is processed with an anion exchange resin. As the alkaline aqueous solution of antimonic acid, it is preferable to use the alkaline aqueous solution of antimonic acid used in the method of producing a sol of antimony oxide disclosed in Japanese Patent Laid-Open Publication No. HEI 2-180717 filed by this applicant.

The alkaline solution of antimonic acid is preferably prepared by reacting antimony trioxide ($Sb_2O_3$), an alkaline substance, and hydrogen peroxide to each other, and is obtained by adding peroxide hydrogen to a system containing antimony trioxide and an alkaline substance at the molar ratio among the antimony oxide, alkaline substance, and hydrogen peroxide of 1:2.0 to 2.5:0.8 to 1.5 and more preferably of 1:2.1 to 2.3:0.9 to 1.2 at the adding rate of 0.2 mole/hr or below of hydrogen peroxide against 1 mole of antimony trioxide.

The antimony trioxide used in this step should preferably is powder thereof, more specifically fine powder with the average particle diameter of 10 μm or below, and the alkaline substance used in this step should preferably be any of $LiOH$, $KOH$, $NaOH$, $Mg(OH)_2$, $Ca(OH)_2$ or the like, and especially a hydroxide of alkaline metal such as KOH, NaOH and the like is preferable. The alkaline substance has the effect of stabilizing the obtained antimonic acid solution.

At first, a suspension of antimony trioxide is prepared by adding prespecified quantities of an alkaline substance and antimony trioxide into water. The concentration of antimony trioxide in the antimony trioxide suspension measured as that of $Sb_2O_3$ should preferably be in the range from 3 to 15% by weight. Then the suspension is heated to 50° C. or more, preferably to 80° C. or more, and then a hydrogen peroxide solution with the concentration in the range from 5 to 35% by weight is added at the rate of 0.2 mole hydrogen peroxide/hr against 1 mole of antimony trioxide. When the adding rate of hydrogen peroxide is higher than 0.2 mole/hr, the particle diameter of the obtained antimony oxide fine particles becomes larger with a wide distribution of particle diameter, which is not preferable.

When the adding rate of hydrogen peroxide is very small, the production efficiency is low, so that the adding rate of hydrogen peroxide should preferably be in the range from 0.04 mole/hr to 0.2 mole/hr, and more specifically in the range from 0.1 mole/hr to 0.15 mole/hr. Further as the molar ratio of hydrogen peroxide against antimony trioxide is smaller, the particle diameter of obtained fine particles of antimony trioxide will become smaller, and when the molar ratio is smaller than 0.8, a quantity of antimony trioxide not dissolved yet becomes larger, which is not preferable. When the molar ratio is larger than 1.5, the particle diameter of obtained fine particles of antimony trioxide becomes larger, which is not preferable.

After residues of substances not dissolved yet are removed from the obtained aqueous solution of antimonic acid alkali ($MHSbO_3$: M indicates an alkaline metal) according to the necessity, the aqueous solution is further diluted and is processed with a cation exchange resin for removing alkali ions to prepare a dispersion of antimony oxide gel ($HSbO_3$—)$_n$.

The aqueous solution of antimonic acid alkali may include an aqueous solution in turn containing a doping substance such as an aqueous solution of stannate alkali or that of sodium phosphate and the like. When the doping substance as described above is contained therein, a silica-based fine particles coated with antimony oxide having higher conductivity can be obtained.

The antimonic acid can be expressed with the formula of ($HSbO_3$—)$_n$ (polymer with the n of 2 or more) and comprises a polymer of antimony oxide ($HSbO_3$—) with the particle diameter in the range from about 1 to about 5 nm, and has a form of gel in which the particles coagulate.

The concentration of the aqueous solution of antimonic acid alkali used in the processing with a cation exchange resin should preferably be, as measured for that of the solid content of ($Sb_2O_5$), in the range from 0.01 to 5% by weight, and more preferably in the range from 0.1 to 3% by weight. When the solid content is less than 0.01% by weight, the production efficiency is low, and when the solid content is over 5% by weight, sometimes large agglomerates may be generated, and in that case the silica-based particles are hardly coated with antimonic acid, and even if the silica-based particles are coated with antimony oxide, the coating film may be heterogeneous.

A quantity of the cation exchange resin used in this step should preferably be adjusted so that pH of the obtained antimonic acid dispersion is in the range from 1 to 4, and more preferably in the range from 1.5 to 3.5. When the pH is less than 1, chain particles are not generated, but agglomerated particles may be generated, and when the pH is over 4, monodisperse particles may be generated.

Further when pH of the antimonic acid dispersion is less than 1, as solubility of the antimony oxide is high, coating with a prespecified quantity of antimony oxide is difficult, and when the pH of the antimonic acid dispersion is over 4, sometimes obtained fine particles of silica coated with antimony oxide agglomerate, which may in turn cause lowering of dispersibility in a coating film or insufficient antistatic effect of the base material with the coating film.

Then the dispersion of antimonic acid is mixed with a dispersion of porous silica-based particles or hollow silica-based particles, and the resultant mixture dispersion is heated at the temperature in the range from 50 to 250° C. and more preferably at the temperature in the range from 70 to 120° C., and then is aged generally for 1 to 24 hours to obtain a dispersion of silica-based particles coated with antimony oxide.

As for the mixing ratio of the antimonic acid dispersion versus the dispersion of silica-based particles, 1 to 200 weight portions, and more preferably 5 to 100 weight portions of antimonic acid as expressed by the formula of $Sb_2O_5$ is added to 100 weight portions of the silica-based particles as the solid phase. When a quantity of antimonic acid mixed therein is less than 1 weight portion, coating may not be carried out homogeneously, or the thickness of the coating layer may be insufficient, and the sufficient effect of coating with the antimony oxide, namely of adding or improving the conductivity may not be obtained. Also when a quantity of antimonic acid mixed therein is over 200 weight portions, a quantity of antimony oxide not contributing to coating may increase with the conductivity of obtained silica-based particles coated with antimony oxide not improved, or the refractive index may be over 1.60.

The concentration of the mixture dispersion measured as that of the solid content is preferably in the range from 1 to 40 weight %, and more preferably in the range from 2 to 30 weight %. When the concentration of the mixture dispersion is less than 1 weight %, the effect of coating with the antimony oxide may be insufficient with the production yield lowered. On the other hand, when the concentration is over 40 weight %, in a case where a large quantity of antimonic acid is used, the obtained silica-based particles coated with antimony oxide may agglomerate.

When the aging temperature is less than 50° C., the antimony oxide coated layer may be loose, or the sufficient effect of improving the conductivity may not be obtained. On the contrary, when the aging temperature is over 200° C., in a case when porous silica-based particles are used, the porosity may become lower and the refractive index of obtained silica-based particles coated with antimony oxide may not become sufficiently lower.

When the antimonic acid dispersion and the dispersion of silica-based particles are mixed with each other, the two types of dispersions may be mixed with each other in batch, but also the antimonic acid gel dispersion may continuously or intermittently be added in a dispersion of porous silica-based particles or hollow silica-based particles over several hours for mixing.

pH of the dispersion of silica-based particles coated with antimony oxide obtained as described above is generally in the range from 1 to 4.

The refractive index of the silica-based particles coated with antimony oxide obtained as described above should preferably be in the range from 1.35 to 1.60; the volume resistivity value should preferably be in the range from 10 to 5000 Ωm/cm; the average particle diameter should preferably be in the range from 5 to 300 nm; and the thickness of the antimony oxide coated layer should preferably be in the range from 0.5 to 30 nm.

The dispersion of hollow silica-based particles used in this invention should preferably be prepared by means of the following processes (a) and (b):

(a) An aqueous solution of a silicate and/or an acidic silicic acid solution and an aqueous solution of an alkali-soluble inorganic compound are simultaneously added in an alkaline aqueous solution or, if required, an alkaline aqueous solution with seed particles dispersed therein, to prepare a dispersion of composite oxide particles with the molar ratio of $MO_X/SiO_2$ in the range from 0.3 to 1.0, the $SiO_2$ indicating silica and $MO_X$ indicating an inorganic oxide other than silica, and in this step, the dispersion of composite oxide particles is adjusted, when the average particle diameter of the composite oxide particles is in the range from about 5 to about 50 nm, by adding an electrolytic salt so that the molar ratio of $(M_E)/(M_S)$ will be in the range from 0.1 to 10, $M_E$ indicating a number of moles of the electrolytic salt and $M_S$ indicating a number of moles of $SiO_2$, or (b) An electrolytic salt is further added in the dispersion of composite oxide particles according to the necessity, and then an acid is added to the dispersion to remove at least a portion of elements other than silicon constituting the composite oxide particles for the purpose to prepare the dispersion of silica-based particles.

Process (a)

As a silicate, one or more types of silicates selected from the group consisting of alkali metal silicate, ammonium silicate, and an organic base silicate are preferably used. As the alkali metal silicate, sodium silicate (water glass) or potassium silicate can be enlisted, and as the organic base, a tertiary ammonium salt such as tetraethyl ammonium salt and amines such as monoethanolamine, diethanolamine, and triethanolamine can be enlisted, and also an alkaline solution prepared by adding ammonia, a tertiary ammonium hydride, and an amine compound is included in the ammonium silicate or the organic base silicate.

As the acidic silicic acid solution, a silicic acid solution prepared, for instance, by processing an aqueous solution of alkaline silicate with a cation exchange resin can be used, and especially an acidic silicic acid solution with the pH in the range from 2 to 4 and the $SiO_2$ content of about 7 weight % or below is preferably used.

As the inorganic oxide, one or more of $Al_2O_3$, $B_2O_3$, $TiO_2$, $ZrO_2$, $SnO_2$, $Ce_2O_3$, $P_2O_5$, $Sb_2O_3$, $MoO_3$, $ZnO_2$, $WO_3$, and the like may be used. As the inorganic oxide comprising two or more oxides, such composite oxide as $TiO_2$—$Al_2O_3$ and $TiO_2$—$ZrO_2$ can be enlisted.

As a raw material for the inorganic oxide as described above, it is preferable to use an alkali-soluble inorganic compound, and an alkali metal salt of or an alkali earth metal salt, an ammonium salt, or a quaternary ammonium salt of metallic or non-metallic oxo acid constituting the inorganic oxide can be enlisted, and more specifically it is preferable to use any of sodium aluminate, sodium tetraborate, zirconyl ammonium carbonate, potassium antimonate, potassium stannate, sodium aluminosilicate, sodium molybdate, cerium nitrate ammonium, sodium phosphate, and the like.

To prepare a dispersion of composite oxide particles, at first an alkaline aqueous solution of the inorganic compound is prepared separately or a mixture aqueous solution thereof is prepared, and then the aqueous solution is gradually added with agitation into an alkali aqueous solution preferably with the pH of 10 or more according to a composition ratio of silica versus an inorganic oxide other than silica for preparing this aqueous solution.

The addition ratio of silica and an inorganic composition each to be added in the alkali aqueous solution should preferably be in the range from 0.3 to 1.0 and more preferably in the range from 0.35 to 0.85 in the term of molar ratio of $MO_X/SiO_2$ in which $SiO_2$ indicates a content of silica and $MO_X$ indicates that of the inorganic oxide other than silica. When the molar ratio of $MO_X/SiO_2$ is less than 0.3, the cavity capacity of silica-based particles finally obtained is not sufficiently large, and on the other hand, when the molar ratio of $MO_X/SiO_2$ is over 1.0, it is difficult to obtain spherical particles of composite oxide, and as a result a ratio of cavity capacity in the obtained hollow particles becomes lower.

When the molar ratio of $MO_X/SiO_2$ is in the range from 0.3 to 1.0, generally silicon atoms and atoms of an element other than silicon are alternately coupled to each other with an oxygen atom therebetween in the structure of the composite oxide particles. Namely, the structure in which an oxygen atom is coupled to each of the four coupling arms of an silicon atom respectively and an element M other than silica is coupled to the oxygen atom is often observed, and in the process (b) described hereinafter in detail, when the element M other than silica is removed, it is possible to remove also the silicon atom associated with the element M as a silicate monomer or an silicate oligomer.

With the production method according to the present invention, it is possible to use a dispersion of seed particles as a starting material when preparing a dispersion of composite oxide particles. In this case, an inorganic oxide of such materials as $SiO_2$, $Al_2O_3$, $TiO_2$, $ZrO_2$, $SnO_2$ and $CeO_2$ and the like, or a composite oxide of these materials such as $SiO_2$—$Al_2O_3$, $TiO_2$—$Al_2O_3$, $TiO_2$—$Al_2O_3$, $TiO_2$—$ZrO_2$, $SiO_2$—$TiO_2$, $SiO_2$—$TiO_2$—$Al_2O_3$ and the like are used in the form of particles thereof as the seed particles, and generally a sol of any of these materials can be used for the purpose. A dispersion of seed particles as described above can be prepared with any of the known methods. For instance, the dispersion can be obtained by adding an acid or an alkali to a metallic salt, a mixture of the metallic salts, an metallic alkoxide corresponding to the inorganic oxide described above, hydrolyzing and aging, if required, the resultant mixture solution.

An aqueous solution of the compound is added to the alkali aqueous solution with the seed particles distributed therein and preferably with the pH adjusted to 10 or more under agitation like in adding the materials into the alkali aqueous solution described above. When composite oxide particles are grown by using the seed particles as a seed, it is easy to control diameters of grown particles, and particles with substantially homogeneous diameters can be obtained. The addition ratio of the silica raw material versus the inorganic oxide each to be added in the seed particle dispersion should be in the same range as that in addition to the alkali aqueous solution described above.

The silica and the inorganic oxide each as a raw material have the high solubility in the alkali side. When the two types of materials are mixed with each other in the pH region allowing the high solubility, the solubility of an oxo acid ions such as silicic acid ions and aluminate acid ions becomes lower, and a complex material formed with the ions segregate and grow into colloidal particles, or segregate on the seed particles and grow into particles.

When preparing a dispersion of the composite oxide particles as described above, the organic silicon compound expressed by the following chemical formula (1) and/or a hydrolysate thereof may be added as a silica feed in an alkali aqueous solution:

$$R_nSiX_{(4-n)} \quad (1)$$

wherein R indicates a not-substituted or a substituted hydrocarbon group having 1 to 10 carbon atoms; X indicates an alkoxy group having 1 to 4 carbon atoms, a silanol group, halogen or hydrogen; and n indicates an integral number in the range from 0 to 3.

Specifically the organic silicon compounds include, but not limited to, tetramethoxysilane, tetraethoxysilane, tetraisopropoxysilane, methyltrimethoxysilane, dimethylmethoxysilane, phenyltrimethoxysilane, diphenyldimethoxysilane, methyltriethoxysilane, dimethyldiethoxysilane, phenyltriethoxysilane, diphenyldiethoxysilane, isobutyltrimethoxysilane, vinyltrimethoxysilane, vinyltriethoxysilane, vinyl-tris (β-methoxy ethoxysilane)silane, 3,3,3-trifluoropropyl trimethoxysilane, methyl-3,3,3-trifluoropropyl dimethoxysilane, β-(3,4 epoxycyclohexyl) ethyltrimethoxysilane, γ-glycidoxytripropyl trimethoxysilane, γ-glycidoxypropylmethyl diethoxysilane, γ-glycidoxypropyl triethoxysilane, γ-methacryloxypropyl methyldimethoxysilane, γ-methacryloxypropyl trimethoxysilane, γ-methacryloxypropyl methyldiethoxysilane, γ-methacryloxypropyl triethoxysilane, N-β (aminoethyl) γ-aminopropyl methyldimethoxysilane, N-β (aminoethyl) γ-aminopropyl trimethoxysilane, N-β (aminoethyl) γ-aminopropyl triethoxysilane, γ-aminopropyl trimethoxysilane, γ-aminopropyl triethoxysilane, N-phenyl-γ-aminopropyl trimethoxysilane, γ-mercaptopropyl trimethoxysilane, trimethylsilanol, methyltrichlorosilane, methyldichlorosilane, dimethyldichlorosilane, trimethylchlorosilane, phenyltrichlorosilane, diphenyldichlorosilane, vinyltrichlorosilane, trimethylbromosilane, and diethylsilane.

In the organic silicon compounds described above, those each with n in the range from 1 to 3 have low hydrophilicity, and therefore it is desirable to previously hydrolyze the compounds so that the compounds can be mixed homogeneously in a reaction system. Any of the methods known as those available for hydrolyzing organic silicon compounds may be employed for the hydrolysis. When a basic material such as a hydroxide of an alkali metal, ammonia water, and amine is used as a catalyst for hydrolysis, the basic catalyst is removed after hydrolysis, and the remaining acid solution may be used. When a hydrolysate is prepared using an acidic catalyst such as an organic acid or an inorganic acid, it is preferable to remove the acidic catalyst, after hydrolysis is completed, by means of ion exchange or the like. The obtained hydrolysate of the organic silicon compound should preferably be used in the form of an aqueous solution. The aqueous solution as used herein indicates the state in which the hydrolysate is not a turbid gel and has transparency.

In the process (a) according to the present invention, when the average particle diameter of the composite oxide particles is generally in the range from 5 to 50 nm (the composite oxide particles in this state are sometimes called as primary particles), an electrolytic salt is added therein so that the ratio $((M_E/M_S))$ between a number of moles of the electrolytic salt $(M_E)$ and a number of moles of $SiO_2$ $(M_S)$ is preferably in the range from 0.1 to 10, and more preferably in the range from 0.2 to 8.

The electrolytic salts which may be used in this process are, for instance, water-soluble ones such as sodium chloride, potassium chloride, sodium nitrate, potassium nitrate, sodium nitrate, potassium sulfate, ammonium nitrate, ammonium sulfate, magnesium chloride, magnesium nitrate, and the like.

The total quantity of electrolytic salt may be added in batch at this point of time, and further the electrolytic salt may be added continuously or intermittently promoting growth of the composite oxide into particles by adding an alkali metal silicate or an inorganic compound other than silica.

Although a required quantity of an electrolytic salt to be added depends on the concentration of the composite oxide particle dispersion, when the molar ratio of $(M_E)/(M_S)$ is less than 0.1, the effect obtained by adding the electrolytic salt is insufficient, and in the process (b) described above, when an acid is added to remove at least a portion of elements constituting the composite oxide particles other than silicon, the composite oxide particles can not preserve the spherical form and are broken, so that sometimes it is difficult to obtain hollow silica-based particles. The reason why this phenomenon occurs when an electrolytic salt is added is still not clear, but it can be considered that the phenomenon occurs because silica is deposited on surfaces of the composite oxide having grown up into particles and the silica not soluble in an acid performs functions as a protection film for the composite oxide particles.

When the molar ratio of $(M_E)/(M_S)$ is over 10, the effect obtained by adding the electrolytic salt is not further improved, and new particles may grow, and is not advantageous from the economical point of view.

When the average particle diameter of the primary particles when the electrolytic salt is added is less than 5 nm, new particles are generated and selective growth of the primary particles does not occur, and further distribution of particle diameter of the composite oxide particles may not be homogeneous.

When the average particle diameter of the primary particles when the electrolytic salt is added is over 50 nm, in the process (b), sometimes removal of elements other than silicon requires a long period of time, or may be impossible.

The average particle diameter of the composite oxide particles obtained as described above is, like in the case of the silica-based particles obtained later, in the range from 4 to 270 nm.

Process (b)

Hollow and spherical silica-based particles can be produced by removing a portion of or all of elements constituting the composite oxide particles other than silicon.

In this process, the electrolytic salt is again added to the dispersion of the composite oxide particles according to the necessity. A quantity of an electrolytic salt added in this step should preferably be in the range from 0.1 to 10 and more preferably in the range from 0.2 to 8 as expressed by the ratio $((M_E)/(M_S))$ between a number of moles of the electrolytic salt $(M_E)$ and a number of moles of $SiO_2$ $(M_S)$.

Then a portion of or all of elements constituting the composite oxide particles are removed, and as the method for removing the elements, there can be enlisted, for instance, a method in which the elements are dissolved and removed by adding a mineral acid or an organic acid therein, a method in which ion exchange is performed by contacting the elements to a cation exchange resin, or a method in which the methods as described above are combined with each other.

Although the required concentration of the composite oxide particles in the dispersion of composite oxide particles varies according to the processing temperature, the concentration is preferably in the range from 0.1 to 50 weight % and more preferably in the range from 0.5 to 25 weight % as converted to a quantity of the oxide(s). When the concentration is less than 0.1 weight %, a quantity of dissolved silica increases, and sometimes the composite oxide particles can not preserve the spherical form, and even if the composite oxide particles can preserve the spherical form, as the concentration is low, so that the processing efficiency becomes lower. When the concentration of composite oxide particles is over 50 weight %, dispersibility of the particles is insufficient, and in the case of composite oxide particles containing a relatively larger quantity of elements other than silicon, sometimes homogeneous or efficient remove of the elements can not be performed with a few times of operations.

The removal of the elements should preferably be performed until the $MO_X/SiO_2$ ratio in the obtained silica-based particles is in the range from 0.0001 to 0.2 and more preferably in the range from 0.0001 to 0.1.

The dispersion with the elements having been removed therefrom can be cleaned by means of any known cleaning method such as ultra filtration and the like. In this case, ultra filtration should be performed after a portion of alkali metal ions, alkali earth metal ions, ammonium ions and the like in the dispersion are previously removed, and in that case a sol with the silica-based particles having high dispersion stability dispersed therein can be obtained. It is to be noted that an organic solvent dispersion sol can be obtained by substituting with an organic solvent according to the necessity.

In the method of producing silica-based particles according to the present invention, after the silica-based particles are cleaned, the silica-based particles may be dried and sintered, if required. The silica-based particles obtained as described above have cavities therein and also have a low refractive index, so that a coating film formed with the silica-based particles has a low refractive index and has the excellent antireflection capability.

In the method of producing silica-based particles according to the present invention, by adding, an alkali aqueous solution, the organic silicon compound expressed by the chemical formula (1) and/or a partially hydrolyzed material thereof, or an acidic silicic acid solution obtained by dealkylating an alkali metal silicate into the dispersion of silica-based particles obtained in the process (b) to form a silica coating layer on the obtained particles:

$$R_nSiX_{(4-n)} \quad (1)$$

wherein R indicates a not-substituted or a substituted hydrocarbon group having 1 to 10 carbon atoms; X indicates an alkoxy group having 1 to 4 carbon atoms, a silanol group, halogen or hydrogen; and n indicates an integral number in the range from 0 to 3.

As the organic silicon compound expressed by the chemical formula (1), the one identical or similar to the organic silicon compound as described may be used. When the organic silicon compound with n of 0 in the chemical formula (1) is used, the organic silicon compound can be used as it is, but when the organic silicon compound with n in the range from 1 to 3 in the formula (1) is used, a partially hydrolyzed material of the organic silicon compound described above should preferably be used.

The silica coating layer as described above is fine and tight, the inside thereof is preserved as a gas phase or a liquid phase having a low refractive index, and therefore when used for forming a coating film, a material having a high refractive index such as, for instance, a resin for coating never comes in, so that an coating film having a low refractive index can be formed.

When the organic silicon compound with n in the range from 1 to 3 is used in the process described above for forming a silica coating layer, the dispersibility in an organic solvent is high, so that a dispersion of silica-based particles having high affinity to a resin can be obtained. Further the material may be subjected to surface processing with a silane coupling agent or the like for use, but as the dispersibility in an organic solvent and the affinity with a resin are excellent, the specific processing as described above is not required.

When a fluorine-containing organic silicon compound is used for forming a silica coating layer, as a coating layer containing fluorine atoms is formed, the obtained particles have a low refractive index and high dispersibility in an organic solvent, and therefore a dispersion of silica-based particles having high affinity with a resin can be obtained. The fluorine-containing organic silicon compounds as described above include, but not limited to, 3,3,3-trifluoropropyl trimethoxysilane, methyl-3,3,3-trifluoropropyl dimethoxysilane, heptadecafluorodecyl methyldimethoxysilane, heptadecafluorodecyl trichlorosilane, heptadecafluorodecyl trimethoxysilane, trifluoropropyl trimethoxysilane, and tridecafluorooctyl trimethoxysilane. Also the compounds expressed by the chemical formulae (2) and (3) may advantageously be used, because the compounds provides the same effect.

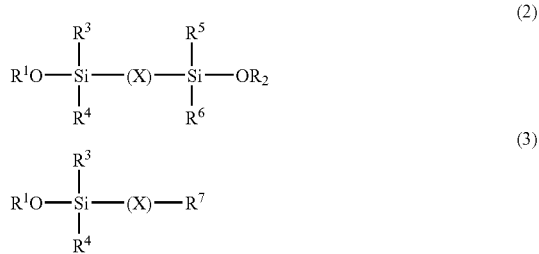

In the chemical formulae (2), (3), $R^1$ may be identical to or different from $R^2$, and indicates an alkyl group, an alkyl halide group, an aryl group, an alkyl aryl group, an aryl alkyl group, an alkenyl group, an hydrogen atom, or a halogen atom.

$R^3$ through $R^7$ may be identical to or different from each other, and indicate an alkoxy group, an alkyl group, an alkyl halide group, an aryl group, an alkyl aryl group, an aryl alkyl group, an alkenyl group, a hydrogen atom, or a halogen atom.

X indicates $-(C_aH_bF_c)-$, and a indicates an integral number which is an even number of 2 or more, while b and c each indicate an integral number which is an even number of 0 or more.

For instance the methoxysilane which is expressed by the formula of $(CH_3O)_3Si\ C_2H_4C_6F_{12}C_2H_4Si\ (CH_3O)_3$ is one of the compounds expressed by the chemical formula (2) above.

The silica-based particles each with the silica coating layer formed thereon may be aged at the temperature in the range from the peripheral temperature to 300° C., and more preferably at the temperature in the range from 50 to 250° C. generally for 1 to 24 hours according to the necessity. When aging is performed, the silica coating layer becomes more homogeneous and tighter, and as a material having a high refractive index can not come into the particles as described above, it is possible to form an effectively coating film having a low refractive index.

The silica-based particles obtained as described above preferably have the average particle diameter in the range from 4 to 270 nm, and more preferably in the range from 8 to 170 nm. When the average particle diameter is less than 4 nm, sufficient cavities can not be obtained, and further sometimes the sufficient effect provided by a low refractive index is not achieved. When the average particle diameter of the silica-based particles is over 270 nm, sometimes the average particle diameter of the obtained silica-based particles coated with antimony oxide may be over 300 nm, and in the case of the transparent coating film prepared with the silica-based particles coated with antimony oxide as described above, sometimes irregularities may be generated on the surface with the transparency lowered or the haze increased. It is to be noted that the average particle diameter of the silica-based particles or the silica-based particles coated with antimony oxide according to the present invention can be obtained by the dynamic light scattering method.

The silica-based particles have cavities therein. Because of the characteristics, in contrast to the fact that the normal silica has the refractive index of 1.45, the silica-based particles have the refractive index in the range from 1.20 to 1.38. The cavities can be identified by observing a cross section of the particles with a transmission type of electron microscope (TEM).

3. Base Material (Substrate) with a Coating Film

In the base material (substrate) with a coating film according to the present invention, a coating film containing the silica-based particles coated with antimony oxide described above and a matrix for forming a coating film is formed on a base material singly or together with other coating film(s) for the purpose of prevention of reflection and electrification, for hard coating, or for other purposes.

The base materials include, but not limited to, glass, a plastic sheet, a plastic film, a plastic lens, a plastic panel, such as polycarbonate, acrylic resin, PET or TAC, a polarized film, cathode ray tube, a luminescent display tube, a liquid crystal display, a projection display, a plasma display, an EL display and the like, and a coating film is formed on the base material, and although it depends on an application, the coating film is formed singly or in combination with a protection film, a flattening film, a high refractive index film, an insulating film, a conductive resin film, a conductive metal particle film, a conductive metal oxide particle film, a primer film used according to the necessity and the like on the base material. With the coating film is used in combination with other type of film, it is not always required that the coating film according to the present invention is formed on an outermost surface.

The coating film as described above can be obtained by applying the embrocation as described below by means of any known method such as the dip method, spray method, spinner method, role coat method, and bar coat method onto the base material, drying the applied film, and further curing the film by heating or irradiation of ultraviolet rays or the like.

The embrocation for forming a coating film used for production of the base material with a coating film according to the present invention is a mixture solution of the dispersion of silica-based particles coated with antimony oxide described above and a matrix for forming a coating film, and sometimes an organic solvent may be mixed therein according to the necessity.

The matrix for forming a coating film is a component capable of forming a coating film on a surface of a base material, and can be selected for use from resins satisfying adhesiveness, hardness, adaptability to application and other required conditions, and the resins include, but not limited to, for instance, a polyester resin, an acrylic resin, an urethane resin, a vinyl chloride resin, an epoxy resin, a melamine resin, a fluorine resin, a silicon resin, a butyral resin, a phenol resin, a vinyl acetate resin, a UV curing resin, an electron beam curing resin, an emulsion resin, a water-soluble resin, a hydrophilic resin, a mixture of the resins, a resin for paint such as copolymers or denatured materials thereof, a hydrolyzable organic silicon compounds such as alkoxysilane described above, and a partially hydrolyzed materials thereof.

When the resin for paint is used as a matrix, for instance, an organic solvent dispersion in which water as a dispersion medium for the dispersion of the silica-based particles coated with antimony oxide, preferably an organic solvent dispersion prepared by processing the silica-based particles coated with antimony oxide with a known coupling agent and then dispersing the particles in an organic solvent, and the resin for paint are mixed with each other and diluted with an appropriate organic solution, and the resultant solution can be used as an embrocation.

On the other hand, when a hydrolyzable organic silicon compound is used as a matrix, for instance, a partially hydrolyzed material of alkoxysilane is obtained by adding water and an acid or an alkali as a catalyst into a mixture solution of alkoxysilane and alcohol, and then the silica-based particles coated with antimony oxide is mixed in the partially hydrolyzed material of alkoxysilane, and the mixture solution is diluted with an organic solvent, if required, to use it as an embrocation.

A weight ratio of silica-based particles coated with antimony oxide and a matrix in the embrocation for forming a coating film is preferably in the range from 1/99 to 9/1. When the weight ratio is over 9/1, strength or adhesiveness of the coating film with the base material lowers, so that the applicability thereof into practical use is degraded, and on the other hand, when the weight ratio is less than 1/99, the effects of lowering a refractive index of a coating film, improving the antistatic capability, and adhesiveness with a base material, and also improving the strength of the coating film are insufficient.

A refractive index of a coating film formed on a surface of the base material varies according to a mixing ratio of the silica-based particles coated with antimony oxide versus a matrix component or the like as well as to a refractive index of a matrix, and is preferably in the range from about 1.35 to about 1.65. A refractive index of the silica-based particles coated with antimony oxide according to the present invention is in the range from 1.35 to 1.60.

EXAMPLE 1

Preparation of Silica-based Particles Coated with Antimony Oxide (P-1)

[Preparation of Silica-based Particles (A-1)]

A mixture of 1,900 g of deionized water and 100 g of silica sol with the $SiO_2$ concentration of 20 weight % having silica particles with an average particle diameter of 5 nm was heated to 80° C. This mother liquid for reaction has the pH of 10.5, and 9,000 g of sodium silicate aqueous solution with the $SiO_2$ content of 1.17 weight % and 9000 g of sodium aluminate aqueous solution with the $Al_2O_3$ content of 0.83 weight % were simultaneously added to the mother liquid. During this operation, temperature of the reaction liquid was preserved at 80° C. pH of the reaction liquid rose to 12.5 immediately after addition of the aqueous solutions above, but little changed later. After addition of the solutions, the reaction liquid was cooled to the room temperature and was cleaned with an ultra filtration film to prepare a $SiO_2/Al_2O_3$ primary particle dispersion with the solid phase content of 20 weight %.

1700 g of deionized water was added to 500 g of this primary particle dispersion and the resultant mixture solution was heated up to 98° C., and keeping the temperature at this level, 53,200 g of ammonium sulfate with the concentration of 0.5 weight % was added to the mixture solution, and then 3000 g of sodium silicate aqueous solution with the $SiO_2$ content of 1.17 weight % and 9000 g of sodium aluminate aqueous solution with the $Al_2O_3$ content of 0.5 weight % were added therein to obtain a dispersion of composite oxide particles (1).

Then 1,125 g of deionized water was added to 500 g of the dispersion of the composite oxide particles (1) having been subjected to cleaning with an ultra filtration film with the solid phase concentration reduced to 13 weight %, and further dense hydrochloric acid (with the concentration of 35.5 weight %) was dripped therein to adjust the pH to 1.0, and the processing for removing aluminum was carried out. Then 10 L of hydrochloric acid aqueous solution with the pH of 3 and 5 L of deionized water were added for separating the aluminum salt dissolved therein with an ultra filtration film to prepare the silica-based particles dispersion (A-1) with the solid phase content of 20 weight %.

The average particle diameter of the silica-based particles (A-1) was 58 nm, and the $MO_x/SiO_2$ (molar ratio) was 0.0097 with the refractive index of 1.30.

[Preparation of Antimonic Acid]

111 g of antimony trioxide (produced by Sumitomo Kinzoku Kozan K. K.: KN with the purity of 98.5 weight %) was suspended in a solution prepared by dissolving 57 g of potassium hydroxide (produced by Asahi Glass K. K: purity of 85 weight %) in 1800 g of deionized water. This suspension was heated to 95° C., and then an aqueous solution prepared by diluting 32.8 g of hydrogen peroxide solution (produced by Hayashi Junyaku K. K., Special class with the purity of 35 weight %) with 110.7 g of deionized water was added to the suspension over 9 hours (0.1 mole/hr) to dissolve the antimony trioxide, and then was aged for 11 hours. After cooling, a 1000 g portion was taken out from the resultant solution and the solution was diluted with 6000 g of deionized water and was subjected to deionization processing with a cation exchange resin (produced by Mitsubishi Kagaku K. K., pk-216). pH of the solution was 2.1 and the conductivity was 2.4 mS/cm.

Then 40 g of antimonic acid with the solid phase concentration of 1 weight % was added to 400 g of a dispersion prepared by diluting the dispersion of silica-based particles (A-1) prepared as described above to the solid phase concentration of 1 weight %, and the resultant solution was agitated at 70° C. for 10 hours and then was condensed with an ultra filtration film to prepare a dispersion of silica-based particles (P-1) coated with antimony oxide with the solid phase concentration of 20 weight %. The average particle diameter of the silica-based particles coated with antimony oxide (P-1) was 60 nm, and the thickness of the antimony oxide coating layer was 1 nm.

300 g of deionized water and 400 g of methanol were added to 100 g of the dispersion of silica-based particles coated with antimony oxide (P-1), and further 3.57 g of ortho ethyl silicate (with the $SiO_2$ content of 28 weight %) was mixed in the solution, and the resultant solution was heated and agitated for 15 hours at 50° C. to prepare a dispersion of silica-based particles coated with antimony oxide (P-1) with a silica coating layer formed thereon. This dispersion was subjected to solvent substitution with methanol by using an ultra filtration film and was condensed to the solid phase concentration of 20 weight %. Then the condensed solution was subjected to solvent substitution with isopropyl alcohol by using a rotary evaporator to obtain an isopropyl alcohol dispersion of silica-based particles (P-1) with the concentration of 20 weight %.

Then 0.73 g of methacrylate-based silane coupling agent (produced by Shinetsu Kagaku: KBM-503) was added in 100 g of isopropyl alcohol dispersion of silica-based particles coated with antimony oxide (P-1) with a silica coating layer formed thereon, and the resultant solution was heated and agitated for 15 hours at 50° C. for forming a silica coating layer to obtain a dispersion of silica-based particles coated with antimony oxide (P-1) each having the processed surface.

A content of the silica-based particles, a content of antimony oxide, a refractive index, and a volume resistivity value of the obtained particles are as shown in Table 1.

Therein the average particle diameter was measured by means of dynamic light scattering method, and the refractive index was measured using a Series A, AA produced by CARGILL as a standard refraction liquid by the following method.

[Method of Measuring a Refraction Index of Particles]
(1) A dispersion of a composite oxide is put in an evaporator and the dispersion medium is evaporated.
(2) The dispersion is dried at 120° C. to obtain powder.
(3) A standard refraction liquid with a known refractive index is dripped by 2 or 3 drops onto a glass plate, and the powder is mixed in the standard refraction liquid.
(4) The operation (3) is performed using various types of standard liquids and a refractive index of the standard refraction liquid when the mixed solution is transparent is determined as that of the particles.

Measurement of the volume resistivity value was made by the following method.

[Measurement of a Volume Resistivity Value]

A ceramic cell having a cylindrical cavity (with the cross section of 0.5 cm$^2$) was used. The cell was placed on a trestle electrode, and 0.6 g of sample powder was filled therein with a projection of an upper electrode having a cylindrical projection inserted into the powder. Then the upper and lower electrodes were pressed with a hydraulic machine and a resistivity value (Ω) and height (cm) of the same when the pressure of 100 kg/cm$^2$ was loaded thereon were measured, and then the resistivity value was multiplied by the height to obtain the volume resistivity value.

Preparation of an Embrocation for Forming a Reflection-preventing and Antistatic Film (ARL-1)

[Preparation of a Solution of a Component for Forming a Matrix (M-1)]

32.14 g of ortho ethyl silicate (SiO$_2$ concentration of 28 weight %) and 1.22 g of heptadecafluorodecyl trimethoxysilane (produced by Shinetsu Kagaku K. K.: KBM-7803) were added in a mixed solution of 54.95 g isopropyl alcohol, 10 g deionized water, and 1.69 g nitric acid with the concentration of 61 weight %, and the resultant solution was agitated for one hour at 50° C. to prepare a solution of a component for forming a matrix (M-1) with the solid phase content of 10 weight %.

Then 1.5 g of the dispersion of silica-based particles coated with antimony oxide having been subjected to the surface processing (P-1) with a silica coating layer formed thereon was mixed in 7 g of the liquid of a component for forming a matrix (M-1), and the resultant solution was diluted with isopropyl alcohol to obtain an embrocation for forming a reflection-preventing and antistatic film (ARL-1) with the solid phase content of 1.0 weight %.

Production of a Base Material (AFR-1) with a Reflection-preventing and Antistatic Film (Transparent Film)

30 ml of the embrocation for forming a reflection-preventing and antistatic film (ARL-1) was applied on a panel glass sheet for a 17-inch CRT maintained at the temperature of 40° C. by the spinner method at the rotating speed of 150 rpm, and the panel glass sheet was dried for 100 seconds at 160° C. and sintered for 30 minutes at 160° C. to produce a base material with a reflection-preventing and antistatic film (ARF-1). The film thickness was 100 nm.

Then the surface resistivity of the obtained reflection-preventing and antistatic film was measured with a surface resistivity meter (produced by Mitsubishi Kagaku K. K.: Hi-rester), and a result of the measurement is as shown in Table 1.

Further the total optical transmittance and hazes were measured with a haze meter (produced by Suga Tester K. K), and a result of the measurement is also shown in Table 1.

The reflection coefficient was measured with a reflection coefficient meter (produced by Otsuka Denshi K. K.: MCPD-2000) according to the procedure as defined in JIS Z8727 and was displayed as a bottom reflection coefficient at the wavelength in the range from 400 to 700 nm.

Further the pencil hardness and abrasion proof capability were assessed by the method as described below and according to the assessment criteria, and a result of the assessment is as shown in Table 1.

[Measurement of Pencil Hardness]

The pencil hardness was measured with a pencil hardness tester according to the procedure as defined in JIS K 5400.

[Measurement of the Abrasion Proof Capability]

The #0000 steel wool was used and slid on the film 50 times under the load of 500 g/cm$^2$, and a surface of the film was visually observed and assessed according to the following criteria, and a result of the measurement is as shown in Table 1.

Criteria for Assessment
No streak flaw observed: ⊚
A few streak flaw observed: ○
Many streak flaws observed: Δ
The surface shaved off: X

EXAMPLE 2

Preparation of Silica-based Particles Coated with Antimony Oxide (P-2)

Silica-based particles coated with antimony oxide (P-2) having a silica coating layer formed thereon and having been subjected to the surface processing was prepared according to the same procedure as employed in Example 1 except the point that 160 g of antimonic acid with the solid phase content of 1 weight % was used. The average particle diameter of silica-based particles coated with antimony oxide (P-2) before formation of a silica coating layer and the surface processing was 62 nm. The thickness of the antimony oxide coating layer was 2 nm.

Preparation of an Embrocation for Forming a Reflection-preventing and Antistatic Film (ARL-2)

An embrocation for forming a reflection-preventing and antistatic film with the solid phase content of 1.0 weight % was prepared according to the same procedure as that employed in Example 1 except the point that a dispersion of silica-based particles (P-2) coated with antimony oxide having a silica coating layer thereon and having been subjected to surface processing was used.

Preparation of a Base Material with a Reflection-preventing and Antistatic Film (Transparent Film) (ARF-2)

A base material with a reflection-preventing and antistatic film (ARF-2) was produced according to the same procedure as employed in Example 1 except the point that an embrocation for forming a reflection-preventing and antistatic film (ARL-2) was used. The thickness of the film was 100 nm.

The surface resistivity, total optical transmittance, haze, and a reflection coefficient of the obtained reflection-preventing and antistatic film were measured, and a result of the measurement is as shown in Table 1. Further the pencil hardness and abrasion proof capability were measured, and a result is as shown in Table 1.

EXAMPLE 3

Preparation of Silica-based Particles Coated with Antimony Oxide (P-3)

A silica coating layer was formed according to the same procedure as that employed in Example 1 except the point that 240 g of antimonic acid with the solid phase content of 1 weight % was used to prepare silica-based particles having been subjected to surface processing and coated with antimony oxide (P-3). The average particle diameter of the silica-based particles coated with antimony oxide (P-3) before formation of the silica coating layer and surface processing was 64 nm, and the thickness of the antimony oxide coating layer was 3 nm.

Preparation of an Embrocation for Forming a Reflection-preventing and Antistatic Film (ARL-3)

An embrocation for forming a reflection-preventing and antistatic film with the solid phase content of 1.0 weight % was prepared according to the same procedure as that employed in Example 1 except the point that a dispersion of surface-processed silica-based particles coated with antimony oxide (ARL-3) was used.

Production of a Base Material with a Reflection-preventing and Antistatic Film (ARF-3)

A base material with a reflection-preventing and antistatic film (ARF-3) was produced according to the same procedure as that employed in Example 1 except the point that an embrocation for forming an reflection-preventing and anti-static film (ARL-3) was used. The film thickness was 100 nm.

The surface resistivity, total optical transmittance, haze, and a reflection coefficient of the obtained reflection-preventing and antistatic film were measured, and a result of the measurement is as shown in Table 1. Further the pencil hardness and abrasion proof capability were assessed and a result of the assessment is as shown in Table 1.

EXAMPLE 4

Preparation of an Embrocation for Forming a Reflection-preventing and Antistatic Film (ARL-4)

[Preparation of a Matrix Component Liquid (M-2)]

85 g of a resin for paint (produced by To a Gousei K. K: M-402), 14 g of a resin for paint (produced by Kyouei Kagaku K. K: Fluorite F16) each as a component for forming a matrix, and 1 g of polymerization starting agent (Chiba Speciality Chemicals: Irgacure184 with the concentration of 30 weight %, Solvent: toluene) were mixed with each other to prepare a matrix component liquid with the resin content of 99 weight % (M-2).

Then 7.5 g of a dispersion of surface-processed silica-based particles coated with antimony oxide and having a silica coating layer thereon (P-1) was mixed in 1.52 g of the matrix component liquid (M-2), and the resultant solution was diluted with isopropyl alcohol to prepare an embrocation for forming a reflection-preventing and antistatic film (ARL-4) with the solid phase content of 3.0 weight %.

Preparation of Paint for Forming a Hard Coat Film (H-1)

Paint for forming a hard coat film (H-1) with the resin content of 30 weight % was prepared by diluting an acrylic resin (produced by Dainippon Ink K. K.: 17-824-9, resin content: 79.8 weight %, solvent: isopropyl alcohol) with isopropyl alcohol.

Production of a Base Material with a Reflection-preventing and Antistatic Film (Transparent Coating Film) (ARF-4)

The paint for forming a hard coat film was applied on a PET film (with the thickness of 100 μm) by means of the bar coater method (#8) and dried for 120 seconds at 80° C., and then was cured by irradiating ultraviolet ray with the intensity of 600 M/cm² to form a hard coat film. The thickness of the hard coat film was 3 μm.

Then the paint for forming a reflection-preventing and antistatic film (transparent coating film) (ARL-4) was applied by means of the bar coater method (#3) and was sintered for 120 seconds at 120° C. and cured by irradiating ultraviolet ray with the intensity of 600 m/cm² to produce a base material with a reflection-preventing and antistatic film (ARF-4). The thickness of the reflection-preventing and antistatic film was 100 nm.

The surface resistivity, total optical transmittance, haze, and a reflection coefficient of the obtained reflection-preventing and antistatic film were measured, and a result of the measurement is as shown in Table 1. Further the pencil hardness and abrasion proof capability of the reflection-preventing and antistatic film were assessed, and a result of the assessment is also shown in Table 1.

EXAMPLE 5

Preparation of an Embrocation for Forming a Reflection-preventing and Antistatic Film (ARL-5)

An embrocation for forming a reflection-preventing and antistatic film (ARL-5) with the solid phase content of 3.0 weight % was prepared according to the same procedure as that employed in Example 4 except the point that a dispersion of surface-processed silica-based particles coated with antimony oxide and having a silica coating layer thereon (P-2) was used.

Production of a Base Material with a Reflection-preventing and Antistatic Film (Transparent Film) (ARF-5)

A hard coat film was formed according to the same procedure and then a base material with a reflection-preventing and antistatic film (ARF-5) was produced according to the same procedure as that employed in Example 4 except the point that the embrocation for forming a reflection-preventing and antistatic film (ARL-5) was used.

The surface resistivity, total optical transmittance, haze, and a reflection coefficient of the obtained reflection-preventing and antistatic film were measured, and a result of the measurement is as shown in Table 1. Further the pencil hardness and abrasion proof capability of the reflection-preventing and antistatic film were assessed, and a result of the assessment is also shown in Table 1.

EXAMPLE 6

Preparation of an Embrocation for Forming a Reflection-preventing and Antistatic Film (ARL-6)

7.5 g of a dispersion of surface-processed silica-based particles coated with antimony oxide and having a silica coating layer formed thereon was mixed in 1.52 g of the matrix component liquid (M-2) prepared according to the same procedure as that employed in Example 4, and the resultant solution was diluted with isopropyl alcohol to prepare an embrocation for forming a reflection-preventing and antistatic film (ARL-6) with the solid phase content of 3.5 weight %.

Production of a Base Material (ARF-6) with a Reflection-preventing and Antistatic Film (Transparent Coating Film)

The paint for forming a hard coat film with the resin content of 30 weight % (H-1) prepared according to the same procedure as that employed in Example 4 was applied on TAC (with this thickness of 80 μm) by means of the bar coater method (#8), and was dried for 120 seconds at 80° C. and was then cured by irradiating ultraviolet ray with the intensity of 600 m/cm² to produce a base material with a hard coat film (ARF-6). The thickness of the hard coat film was 3 μm.

The surface resistivity, total optical transmittance, haze, and a reflection coefficient of the obtained reflection-preventing and antistatic film were measured, and a result of the measurement is as shown in Table 1. Further the pencil hardness and abrasion proof capability of the reflection-preventing and antistatic film were assessed, and a result of the assessment is also shown in Table 1.

EXAMPLE 7

Preparation of an Embrocation for Forming a Reflection-preventing and Antistatic Film (ARL-7)

A matrix component liquid (M-1) with the solid phase content of 10 weight % was prepared according to the same procedure as that employed in Example 1.

Then 1.5 g of a dispersion of surface-processed silica-based particles (P-1) coated with antimony oxide and having a silica coating layer formed thereof was added in 7 g of the matrix component liquid (M-1), and the resultant solution was diluted with isopropyl alcohol to prepare an embrocation for forming a reflection-preventing and antistatic film with the solid phase content of 3.5 weight % (ARL-7).

Production of a Base Material (ARF-7) with a Reflection-preventing and Antistatic Film (Transparent Coating Film)

The paint for forming a hard coat film with the resin content of 30 weight % (H-1) prepared according to the same procedure as that employed in Example 4 was applied to TAC (with the thickness of 80 μm) by means of the bar coater method (#8) and was dried for 120 seconds at 80° C., and was then cured by irradiating an ultraviolet ray with the intensity of 600 m/cm² to produce a material with a hard coat film (ARF-6). The thickness of the hard coat film was 3 μm.

The surface resistivity, total optical transmittance, haze, and a reflection coefficient of the obtained reflection-preventing and antistatic film were measured, and a result of the measurement is as shown in Table 1. Further the pencil hardness and abrasion proof capability of the reflection-preventing and antistatic film were assessed, and a result of the assessment is also shown in Table 1.

EXAMPLE 8

Preparation of an Embrocation with a Reflection-preventing and Antistatic Film (ARL-8)

A matrix component liquid with the resin content of 99 weight % (M-2) was prepared according to the same procedure as that employed in Example 4.

7.5 g of a dispersion of surface-processed silica-based particles coated with antimony oxide and having a silica coating layer thereon (P-1) was mixed in 1.52 g of the matrix component liquid (M-2), and the resultant solution was diluted with isopropyl alcohol to prepare an embrocation for forming a reflection-preventing and antistatic film with the solid content of 2.0 weight % (ARL-8).

Production of a Base Material (ARF-8) with a Reflection-preventing and Antistatic Film (Transparent Coating Film)

The paint for forming a hard coat film with the resin content of 30 weight % (H-1) prepared according to the same procedure as that employed in Example 4 was applied to an acrylic plate (with this thickness of 80 μm) by means of the dip coater method (at the pulling-up speed of 3 mm/sec) and was dried for 120 seconds at 80° C., cured by irradiating ultraviolet ray with the intensity of 600 m/cm² to form a hard coat film. The thickness of the hard coat film was 3 μm.

Then the embrocation for forming a reflection-preventing and antistatic film (ARL-8) was applied by means of the dip coater method (at the pulling-up speed of 3 mm/sec) and was dried for 120 seconds at 80° C. and cured by irradiating ultraviolet ray with the intensity of 600 m/cm² to produce a base material with a reflection-preventing and antistatic film (ARF-8). The thickness of the reflection-preventing and antistatic film was 100 nm.

The surface resistivity, total optical transmittance, haze, and a reflection coefficient of the obtained reflection-preventing and antistatic film were measured, and a result of the measurement is as shown in Table 1. Further the pencil hardness and abrasion proof capability of the reflection-preventing and antistatic film were assessed, and a result of the assessment is also shown in Table 1.

COMPARATIVE EXAMPLE 1

Preparation of Silica-based Particles (P-4)

An aqueous dispersion of silica-based particles with the solid phase content of 20 weight % was prepared according to the same procedure as that employed in Example 1.

Then 300 g of deionized water and 400 g of methanol were added in 100 g of the dispersion of silica-based particles (A-1), and further 3.57 g of ortho ethyl silicate (with the $SiO_2$ content of 28 weight %), and the resultant solution was heated and agitated for 15 hours at 50° C. to prepare an aqueous dispersion of silica-based particles coated with a silica coating layer. This dispersion was subjected to solvent substitution with methanol with an ultra filtration film and condensate to the solid phase content of 20 weight %. Then the condensed solution was subjected to solvent substitution with isopropyl alcohol with a rotary evaporator to obtain an isopropyl alcohol dispersion of silica-based particles with the concentration of 20 weight % (A-1).

Then 0.73 g of methacrylate-based coupling agent (produced by Shinetsu Kagaku K. K.: KBM-503) was added in 100 g of the isopropyl alcohol dispersion of the silica-based particles (A-1), and the mixture solution was heated and agitated for 15 hours at 50° C. for forming a silica coating layer to prepare surface-processed silica-based particles (P-4). The average particle diameter of the surface-processed silica-based particles (P-4) and having a silica coating layer thereon was 58 nm.

Preparation of an Embrocation for Forming a Reflection-preventing and Antistatic Film (RARL-L1)

A matrix component liquid (M-1) with the solid phase content of 10 weight % was prepared according to the procedure as that employed in Example 1.

Then 1.5 g of a dispersion of surface-processed silica-based particles having a silica coating layer therein (P-4) prepared as described above was mixed in 7 g of the matrix component liquid (M-1), and the resultant solution was diluted with isopropyl alcohol to prepare an embrocation for forming a reflection-preventing and antistatic film (RARL-1) with the solid phase content of 1.0 weight %.

Production of a Base Material (RARF-1) with a Reflection-preventing and Antistatic Film (Transparent Coating Film)

30 ml of the embrocation for forming a reflection-preventing and antistatic film (RARL-1) was applied onto a panel glass sheet for a CRT with the temperature adjusted to 40° C. by means of the spinner method at the rotational speed of 150 rpm, and was dried for 100 seconds at 160° C. and sintered for 30 minutes at 160° C. to produce a base material with a reflection-preventing and antistatic film (RARF-1). The thickness of the coating film was 1 μm.

The surface resistivity, total optical transmittance, haze, and a reflection coefficient of the obtained reflection-preventing and antistatic film were measured, and a result of the measurement is as shown in Table 1. Further the pencil hardness and abrasion proof capability of the reflection-preventing and antistatic film were measured, and a result of the measurement is also shown in Table 1.

COMPARATIVE EXAMPLE 2

Preparation of an Embrocation for Reflection-preventing and Antistatic Film (RARL-2)

A matrix component liquid (M-2) with the resin content of 99 weight % was prepared according to the same procedure as that employed in Example 4.

Then 7.5 g of a dispersion of surface-processed silica-based particles having a silica coating layer thereon (P-4) prepared like in Comparative Example 1 was mixed in 1.52 g of the matrix component liquid (M-2), and the resultant solution was diluted with isopropyl alcohol to prepare an embrocation for forming a reflection-preventing and antistatic film (RARL-2) with the solid phase content of 3.0 weight %.

Production of a Base Material with a Reflection-preventing and Antistatic Film (RARF-2)

The paint for forming a hard coat film prepared according to the same procedure as that employed in Example 4 (H-1) was applied onto a PET film (with the thickness of 100 μm) by means of the bar coater method (#8), and was dried for 120 seconds at 80° C. and was then cured by irradiating ultraviolet ray with the intensity of 600 M/cm² to form a hard coat film. The thickness of the hard coat film was 3 μm.

Then the embrocation for forming a reflection-preventing and antistatic film (RARL-2) was applied by means of the bar coater method (#3) and was sintered for 120 seconds at 120° C. and was cured by irradiating ultraviolet ray with the intensity of 600 m/cm² to produce a base material with a reflection-preventing and antistatic film (RARF-2). The thickness of the reflection-preventing and antistatic film was 1 μm.

The surface resistivity, total optical transmittance, haze, and a reflection coefficient of the obtained reflection-preventing and antistatic film were measured, and a result of the measurement is as shown in Table 1. Further the pencil hardness and abrasion proof capability of the reflection-preventing and antistatic film were assessed, and a result of the assessment is also shown in Table 1.

COMPARATIVE EXAMPLE 3

Preparation of an Embrocation for Forming a Reflection-preventing and Antistatic Film (RARL-3)

A matrix component liquid with the resin content of 99 weight % was prepared according to the same procedure as that employed in Example 4.

Then 7.5 g of a dispersion of the surface-processed silica-based particles having a silica coating layer thereon (P-4) was added in 1.52 g of the matrix component liquid (M-2), and the resultant solution was diluted with isopropyl alcohol to prepare an embrocation for forming a reflection-preventing and antistatic film with the solid phase content of 3.0 weight % (RARL-3).

The paint for forming a hard coat film (H-1) prepared according to the same procedure employed in Example 4 was applied onto TAC (with the thickness of 80 μm) by means of the bar coater method (#8) and was sintered for 120 seconds at 80° C. and was then cured by irradiating ultraviolet ray with the intensity of 600 m/cm² to form a hard coat film. The thickness of the hard coat film was 3 μm.

Then the embrocation for forming a reflection-preventing and antistatic film (RARL-3) was applied by means of the bar coater method (#3) and was sintered for 120 seconds at 120° C. and was cured by irradiating ultraviolet ray with the intensity of 600 m/cm² to produce a base material with a reflection-preventing and antistatic film (RARF-3). The thickness of the reflection-preventing and antistatic film was 100 nm.

The surface resistivity, total optical transmittance, haze, and a reflection coefficient of the obtained reflection-preventing and antistatic film were measured, and a result of the measurement is as shown in Table 1. Further the pencil hardness and abrasion proof capability of the reflection-preventing and antistatic film were assessed, and a result of the assessment is also shown in Table 1.

COMPARATIVE EXAMPLE 4

Preparation of Antimony Oxide Particles (P-5)

111 g of antimony trioxide (produced by Sumitomo Kinzoku Kouzan K. K: KN, purity: 98.5 weight %) was suspended in a solution prepared by dissolving 57 g of potassium hydroxide (produced by Asahi Glass K. K: purity of 85 weight %) in 1800 g of deionized water. This suspension was heated to 95° C., and then an aqueous solution prepared by diluting 59.2 g of hydrogen peroxide (produced by Hayashi Junyaku K. K., purity: 35 weight %) with 194.9 g of deionized water was added to the suspension over 6 hours (0.27 mole/hr) with antimony trioxide dissolved therein, and the resultant solution was aged for 14 hours. After the solution was cooled, a 1000 g portion was taken out from the resultant solution and the solution ws diluted with 6000 g of deionized water and the solution was passed through a cation exchange resin (produced by Mitsubishi Kagaku K. K.: pk-216). pH of the solution was 2.0 and the conductivity thereof was 3.1 mS/cm.

Then the solution was aged for 10 hours at 70° C. and was condensed with an ultra filtration film to prepare a dispersion of antimony oxide particles with the solid phase content of 14 weight %. pH of the obtained antimony oxide particle dispersion (R-1) was 2.1 and the conductivity thereof was 1.2 mS/cm. The average particle diameter, a refractive index, and a volume resistivity value of the antimony oxide particles are as shown in Table 1.

The dispersion of antimony oxide particles (R-1) was diluted to obtain a dispersion with the solid phase content of 5 weight %, and 100 g of methanol was added in 100 g of this dispersion and then 1.79 g of ortho ethyl silicate (with the $SiO_2$ content of 28 weight %) was mixed therein. The resultant solution was heated and agitated for 15 hours at 50° C. to prepare a dispersion of antimony oxide particles with a silica coating layer formed thereon. This dispersion was subjected to solvent substitution with methanol using an ultra filtration film and was condensed until the solid phase content was 20 weight %. Then the dispersion was subjected to solvent substitution with isopropyl alcohol using a rotary evaporator to obtain an isopropyl alcohol dispersion of antimony oxide particles with the concentration of 20 weight %.

Then 1.5 g of methacrylate-based silane coupling agent (produced by Shinetsu Kagaku K. K.: KBM-503) was added in 100 g of the isopropyl alcohol dispersion of antimony oxide particles having a silica coating layer formed thereon, and the resultant solution was heated and agitated for 15 hours at 50° C. for forming a silica coating layer thereon to prepare a dispersion of surface-processed antimony oxide particles (P-5).

A refractive index and a volume resistivity value of the obtained particles are as shown in Table 1.

Preparation of an Embrocation for Forming a Reflection-preventing and Antistatic Film (RARL-4)

A matrix component liquid with the resin content of 99 weight % (M-2) was prepared according to the same procedure as that employed in Example 4.

Then 25.38 g of a dispersion of surface-processed antimony oxide particles having a silica coating layer formed thereon (P-5) prepared as described above was mixed in 5.05 g of the matrix component liquid (M-2) and the resultant solution was diluted with isopropyl alcohol to form an embrocation for forming a reflection-preventing and antistatic film with the solid phase content of 2.0 weight % (RARL-4).

Production of a Base Material with a Reflection-preventing and Antistatic Film (RARF-4)

The paint for forming a hard coat film (H-1) prepared according to the same procedure as that employed in Example 4 was applied to a denatured acrylic plate (with the thickness of 80 μm) by means of the dip coater method (at the pulling-up speed of 3 mm/sec) and was dried for 120 seconds at 80° C. and was cured by irradiating ultraviolet ray with the intensity of 600 m/cm² to form a hard coat film. The thickness of the hard coat film was 3 μm.

Then the embrocation for forming a reflection-preventing and antistatic film (RARL-4) was applied by means of the dip coater method (at the pulling-up speed of 3 mm/sec) and was dried for 120 seconds at 80° C. and was cured by irradiating ultraviolet ray with the intensity of 600 m/cm² to produce a base material with a reflection-preventing and antistatic film (RARF-4). The thickness of the reflection-preventing and antistatic film was 100 nm.

The surface resistivity, total optical transmittance, haze, and a reflection coefficient of the obtained reflection-preventing and antistatic film were measured, and a result of the measurement is as shown in Table 1. Further the pencil hardness and abrasion proof capability of the reflection-preventing and antistatic film were assessed, and a result of the assessment is also shown in Table 1.

EXAMPLE 9

Preparation of Paint for Forming a Hard Coat Film (H-2)

23.3 g of the paint for forming a hard coat film (H-1) prepared according to the same procedure as that employed in Example 4 and 15 g of a dispersion of surface-processed silica-based particles (P-1) coated with antimony oxide and having a silica coating layer thereon prepared according to the same procedure as that employed in Example 1, were mixed with each other, and the resultant dispersion was diluted with isopropyl alcohol to prepared paint for forming a hard coat film (H-2) with the solid phase content of 20 weight %.

Preparation of a Base Material with a Hard Coat Film (HF-1)

The paint for forming a hard coat film (H-2) was applied on TAC (with the thickness of 80 μm) by means of the bar coater method (#12) and was dried for 120 seconds at 80° C. and then cured by irradiating ultraviolet ray with the intensity of 600 m/cm² to prepare a base material with a hard coat film (HF-1). The thickness of the hard coat film was 3 μm.

The surface resistivity, total optical transmittance, haze and a reflection coefficient of the obtained base material with a hard coat film were measured, and a result of the measurement is as shown in Table 2. Further the pencil hardness and abrasion proof capability were assessed, and a result of the assessment is as shown in Table 2.

EXAMPLE 10

Preparation of Paint for Forming a Hard Coat Film (H-3)

20 g of the paint for forming a hard coat film (H-1) prepared according to the same procedure as that employed in Example 4 and 20 g of a dispersion of surface-processed silica-based particles coated with antimony oxide and having a silica coating layer prepared according to the same procedure as that employed in Example 1, were mixed with each other, and the resultant solution was diluted with isopropyl alcohol to prepare paint for forming a hard coat film (H-3) with the solid phase content of 20 weight %.

Preparation of a Base Material with a Hard Coat Film (HF-2)

The paint for forming a hard coat film (H-3) was applied on TAC (with the thickness of 80 μm) by means of the bar coater method (#12) and cured by irradiating ultraviolet ray with the intensity of 600 m/cm² to prepare a base material with a hard coat film (HF-2). The thickness of the hard coat film was 3 μm.

The surface resistivity, total optical transmittance, haze, and a reflection coefficient of the obtained base material with a hard coat film were measured, whether any interference pattern is present or not was checked, and a result of the measurement and observation is shown in Table 2. Further the pencil hardness and abrasion proof capability were assessed, and a result of the assessment is as shown in Table 2.

EXAMPLE 11

Preparation of Paint for Forming a Hard Coat Film (H-4)

16.7 g of the paint for forming a hard coat film (H-1) prepared according to the same procedure as that employed in Example 4 and 25 g of a dispersion of surface-processed silica-based particles (P-1) coated with antimony oxide and having a silica coating layer formed thereon prepared according to the same procedure as that employed in Example 1, were mixed with each other, and the resultant solution was diluted with isopropyl alcohol to prepare paint for forming a hard coat film (H-4) with the solid phase content of 20 weight %.

Preparation of a Base Material with a Hard Coat Film (HF-3)

The paint for forming a hard coat film (H-4) was applied on a denatured acrylic resin plate (with the thickness of 80 μm) by means of the dip coater method (at the pulling-up speed of 1 mm/sec), and was dried for 120 seconds at 80° C. and cured by irradiating ultraviolet ray with the intensity of 600 M/cm$^2$ to prepare a base material with a hard coat film (HF-3). The thickness of the hard coat film was 3 μm.

The surface resistivity, total optical transmittance, haze, and a reflection coefficient of the obtained base material with a hard coat film were measured, whether any interference pattern is present or not was checked, and a result of the measurement and observation is shown in Table 2. Further the pencil hardness and abrasion proof capability were assessed, and a result of the assessment is as shown in Table 2.

COMPARATIVE EXAMPLE 5

Preparation of Paint for Forming a Hard Coat Film (RH-1)

20 g of paint for forming a hard coat film (H-1) prepared according to the same procedure as that employed in Example 4 and 20 g of the dispersion of surface-processed silica-based particles (P-4) having a silica coating layer formed thereon prepared according to the same procedure as that employed in Comparative Example 1 were mixed with each other, and the resultant solution was diluted with isopropyl alcohol to prepare paint for forming a hard coat film (RH-1) with the solid phase content of 20 weight %.

Preparation of a Base Material with a Hard Coat Film (RHF-1)

The paint for forming a hard coat film (RH-1) was applied on TAC (with the thickness of 80 μm) by means of the bar coater method (#12) and was dried for 120 seconds at 80° C. and cured by irradiating ultraviolet ray with the intensity of 600 m/cm$^2$ to prepare a base material with a hard coat film (RHF-1). The thickness of the hard coat film was 3 μm.

The surface resistivity, total optical transmittance, haze, and a reflection coefficient of the obtained base material with a hard coat film were measured, whether any interference pattern is present or not was checked, and a result of the measurement and observation is shown in Table 2. Further the pencil hardness and abrasion proof capability were assessed, and a result of the assessment is as shown in Table 2.

COMPARATIVE EXAMPLE 6

Preparation of Paint for Forming a Hard Coat Film (RH-2)

16.7 g of the paint for forming a hard coat film (H-1) prepared according to the same procedure as that employed in Example 4 and 25 g of the dispersion of surface-processed antimony oxide particles having a silica coating layer thereon prepared according to the same procedure as that employed in Comparative Example 4 were mixed with each other, and the resultant solution was diluted with isopropyl alcohol to prepared the paint for forming a hard coat film (RH-1) with the solid phase content of 20 weight %.

Preparation of a Base Material with a Hard Coat Film (RHF-2)

The paint for forming a hard coat film (RH-2) was applied on a denatured acrylic resin plate (with the thickness of 80 μm) by means of the dip coater method (at the pulling-up speed of 1 mm/sec), and was dried for 120 seconds at 80° C. and cured by irradiating ultraviolet ray with the intensity of 600 m/cm$^2$ to prepare a base material with a hard coat film (RHF-2). The thickness of the hard coat film was 3 μm.

The surface resistivity, total optical transmittance, haze, and a reflection coefficient of the obtained base material with a hard coat film were measured, whether any interference pattern is present or not was checked, and a result of the measurement and observation is shown in Table 2. Further the pencil hardness and abrasion proof capability were assessed, and a result of the assessment is as shown in Table 2.

TABLE 1

Substrate with a Coating Film (Composition)

| | Substrate | | Silica-based Particles coated with Antimony Oxide | | | | | | | | Matrix | | |
| | | | Silica-based Particles | | | | Content of | | Volume Resist. | | | | |
| | Type | Refract. Index | Type | Av.P.D. nm | Refract. Index | Content wt % | Sb2O3 wt % | Content wt % | Refract. Index | Value Ω·cm | NO. | Type | Refract. Index | Content wt % |
|---|---|---|---|---|---|---|---|---|---|---|---|---|---|---|
| Example 1 | Glass (Panel) | 1.55 | P-1 | 58 | 1.30 | 90 | 10 | 30 | 1.41 | 1500 | M-1 | SiO2 | 1.44 | 70 |
| Example 2 | Glass (Panel) | 1.55 | P-2 | 58 | 1.30 | 60 | 40 | 30 | 1.52 | 800 | M-1 | SiO2 | 1.44 | 70 |
| Example 3 | Glass (Panel) | 1.55 | P-3 | 58 | 1.30 | 40 | 60 | 30 | 1.55 | 450 | M-1 | SiO2 | 1.44 | 70 |
| Example 4 | PET | 1.65 | P-1 | 58 | 1.30 | 90 | 10 | 50 | 1.41 | 1500 | M-2 | Organic Resin | 1.48 | 50 |
| Example 5 | PET | 1.65 | P-2 | 58 | 1.30 | 60 | 40 | 50 | 1.52 | 800 | M-2 | Organic Resin | 1.48 | 50 |

TABLE 1-continued

| | Substrate | | | Silica-based Particles | | | | | | | | Matrix | | |
|---|---|---|---|---|---|---|---|---|---|---|---|---|---|---|
| | Type | Refract. Index | Type | Av.P.D. nm | Refract. Index | Content wt % | Sb2O3 Content wt % | Content wt % | Refract. Index | Volume Resist. Value Ω·cm | NO. | Type | Refract. Index | Content wt % |
| Example 6 | TAC | 1.50 | P-1 | 58 | 1.30 | 90 | 10 | 50 | 1.52 | 450 | M-2 | Organic Resin | 1.48 | 50 |
| Example 7 | TAC | 1.50 | P-1 | 58 | 1.30 | 90 | 10 | 30 | 1.41 | 1500 | M-1 | SiO2 | 1.44 | 70 |
| Example 8 | Acrylic | 1.55 | P-1 | 58 | 1.30 | 90 | 10 | 50 | 1.41 | 1500 | M-2 | Organic Resin | 1.48 | 50 |
| Comparative Example 1 | Glass (Panel) | 1.55 | P-4 | 58 | 1.30 | 100 | — | — | 1.30 | 2200 | M-1 | SiO2 | 1.44 | 70 |
| Comparative Example 2 | PET | 1.65 | P-4 | 58 | 1.30 | 100 | — | — | 1.30 | 2200 | M-2 | Organic Resin | 1.48 | 50 |
| Comparative Example 3 | TAC | 1.50 | P-4 | 58 | 1.30 | 100 | — | — | 1.30 | 2200 | M-2 | Organic Resin | 1.48 | 50 |
| Comparative Example 4 | Acrylic | 1.55 | Sb2O5 P-5 | 20 | 1.63 | 100 | — | — | 1.63 | 500 | M-2 | Organic Resin | 1.48 | 50 |

| | Substrate with a Coating Film (Characteristics) | | | | | | | | |
|---|---|---|---|---|---|---|---|---|---|
| | Hard Coat Film | | Total | | | | | Strength | Surface |
| | NO. | Thickness μm | Refract. Index | Optical Transmit % | Haze | Reflect. Coeff. | Pencil Hardness | (Steel Wool) | Resistivity Ω/□ |
| Example 1 | — | — | 1.43 | 97.8 | 0.1 | 1.4 | 9H | ◎ | 3.4E+09 |
| Example 2 | — | — | 1.46 | 96.9 | 0.1 | 1.7 | 9H | ◎ | 1.2E+09 |
| Example 3 | — | — | 1.47 | 96.8 | 0.1 | 1.8 | 9H | ◎ | 7.5E+08 |
| Example 4 | H-1 | 3 | 1.45 | 98.5 | 0.1 | 1.6 | 3H | ○ | 3.5E+10 |
| Example 5 | H-1 | 3 | 1.50 | 98.0 | 0.1 | 2.0 | 3H | ○ | 8.5E+09 |
| Example 6 | H-1 | 3 | 1.50 | 97.2 | 0.1 | 1.8 | 3H | ○ | 4.5E+10 |
| Example 7 | H-1 | 3 | 1.43 | 97.8 | 0.1 | 1.4 | 3H | ○ | 3.4E+09 |
| Example 8 | H-1 | 3 | 1.43 | 98.1 | 0.1 | 1.8 | 6H | ○ | 2.8E+10 |
| Comparative Example 1 | — | — | 1.45 | 97.7 | 0.1 | 1.8 | 9H | ◎ | 3.0E+14 |
| Comparative Example 2 | H-1 | 3 | 1.46 | 98.2 | 0.1 | 1.7 | 2H | △ | 1.0E+14 |
| Comparative Example 3 | H-1 | 3 | 1.46 | 97.2 | 0.1 | 1.7 | 2H | △ | 1.0E+14 |
| Comparative Example 4 | H-1 | 3 | 1.56 | 97.3 | 0.1 | 2.5 | 4H | △ | 3.5E+09 |

TABLE 2

Substrate with a Coating Film (Composition)

| | Substrate | | Silica-based Particles coated with Antimony Oxide | | | | | | | | Matrix | | |
|---|---|---|---|---|---|---|---|---|---|---|---|---|---|
| | | | Silica-based Particles | | | | Content of | | | Volume Resist. | | | |
| | Type | Refract. Index | Type | Av.P.D. nm | Refract. Index | Content wt % | Sb2O3 wt % | Content wt % | Refract. Index | Value Ω·cm | NO. | Type | Refract. Index | Content wt % |
| Example 9 | TAC | 1.50 | P-1 | 58 | 1.30 | 90 | 10 | 30 | 1.41 | 1500 | H-1 | Organic Resin | 1.55 | 70 |
| Example 10 | TAC | 1.50 | P-1 | 58 | 1.30 | 90 | 10 | 40 | 1.41 | 1500 | H-1 | Organic Resin | 1.55 | 60 |
| Example 11 | Acrylic | 1.55 | P-3 | 58 | 1.30 | 60 | 40 | 50 | 1.55 | 450 | H-1 | Organic Resin | 1.55 | 50 |
| Comparative Example 5 | TAC | 1.50 | P-4 | 58 | 1.30 | 100 | — | 40 | 1.30 | 2200 | H-1 | Organic Resin | 1.55 | 60 |
| Comparative Example 6 | Acrylic | 1.55 | P-5 Sb2O5 | 20 | | 100 | — | 50 | 1.63 | 500 | H-1 | Organic Resin | 1.55 | 50 |

Substrate with Hard Coat Film (Characteristics)

| | Thickness μm | Refract. Index | Total Optical Transmit % | Haze | Reflect. Coeff. | Pencil Hardness | Strength (Steel Wool) | Surface Resistivity Ω/□ | Interference pattern |
|---|---|---|---|---|---|---|---|---|---|
| Example 9 | 3 | 1.50 | 90.2 | 0.1 | 4.5 | 3H | ○ | 1.0E+10 | No |
| Example 10 | 3 | 1.49 | 90.5 | 0.1 | 4.5 | 3H | ○ | 5.5E+09 | No |
| Example 11 | 3 | 1.55 | 90.5 | 0.1 | 5.0 | 6H | ○ | 4.3E+09 | No |
| Comparative Example 5 | 3 | 1.51 | 90.3 | 0.1 | 4.5 | 3H | ○ | 1.0E+14 | No |
| Comparative Example 6 | 3 | 1.59 | 90.5 | 0.1 | 5.5 | 4H | ○ | 2.1E+08 | Yes |

What is claimed is:

1. Silica-based particles coated with antimony oxide each comprising a silica-based particle and an antimony oxide coating layer, wherein said silica-based particles with the antimony oxide coatings have an average particle diameter in a range from 5 to 300 nm, a refractive index in a range from 1.35 to 1.60 and a volume resistivity value in a range from 10 to 5000 Ω/cm.

2. The silica-based particles coated with antimony oxide according to claim 1, wherein said silica-based particles are porous silica-based particles or hollow silica-based particles.

3. The silica-based particles coated with antimony oxide according to claim 2, wherein a thickness of the antimony oxide coating layer is in a range from 0.5 to 30 nm.

4. The silica-based particles coated with antimony oxide according to claim 2, wherein the porous or hollow silica-based particles with the antimony oxide coatings have an average particle diameter in a range from 8 to 170 nm.

5. The silica-based particles coated with antimony oxide according to claim 1, wherein a thickness of the antimony oxide coating layer is in a range from 0.5 to 30 nm.

6. A substrate having a coating film containing the silica-based particles coated with antimony oxide according claim 1 and a matrix for forming a coating film formed singly or together with other coating film(s) on a surface thereof.

7. The silica-based particles coated with antimony oxide according to claim 1, wherein the silica-based particles with the antimony oxide coatings have an average particle diameter in a range from 10 to 200 nm.

* * * * *